Oct. 24, 1961 E. LORETAN 3,005,667
SHOCK-ABSORBING BEARING FOR MOVABLE ELEMENTS OF SMALL
MECHANISMS, NOTABLY OF MEASURING INSTRUMENT
Filed July 8, 1959

INVENTOR
EDOUARD LORETAN
BY
ATTORNEY

United States Patent Office 3,005,667
Patented Oct. 24, 1961

3,005,667
SHOCK-ABSORBING BEARING FOR MOVABLE ELEMENTS OF SMALL MECHANISMS, NOTABLY OF MEASURING INSTRUMENT
Edouard Loretan, Le Sentier, Switzerland, assignor to Parechoc S.A., Le Sentier, Switzerland, a Swiss firm
Filed July 8, 1959, Ser. No. 825,769
Claims priority, application Switzerland July 10, 1958
1 Claim. (Cl. 308—159)

The present invention relates to a shock-absorbing bearing for a movable element of a small mechanism, notably of a measuring instrument.

This bearing is characterised by a movable bearing body comprising a pivot bearing, disposed with clearance within a bearing support, the latter having an annular centering seat with which there co-operates, under the action of a resilient return device, a corresponding bearing surface of the bearing body, which surface is situated in the immediate neighbourhood of the inlet of the pivot bearing.

The accompanying drawings illustrate by way of example a number of constructional forms of the subject of the invention.

Figure 1:
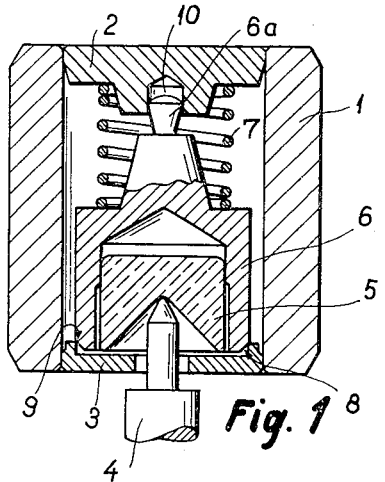
FIGURE 1 is an axial section through a first constructional form of a shock-absorbing bearing for the movable element of a small mechanism.

The bearing illustrated in FIGURE 1 comprises a support consisting of a sleeve 1, a plug 2, forced into the said sleeve at its rear end, and a plug 3 formed with a central aperture, which is forced into the sleeve at its forward end. The said sleeve is designed to be forced into the frame of the instrument on which the bearing is mounted.

The conical end of the shaft designated 4 is engaged in the conical recess in a stone pivot bearing 5. The latter is driven into a bush 6 lodged with clearance in the sleeve 1. The pivot bearing 5 and the bush 6 constitute a movable bearing body subjected to the action of a shock-absorbing coil spring 7. The latter bears at one end against the plug 2 and at the other end against the bush 6, and tends to maintain a frustoconical bearing surface 8 formed on the bush 6, at the level of the inlet of the recess of the pivot bearing, against a seat 9 consisting of an annular edge of a shoulder formed on the plug 3. In the event of small transverse movements of the shaft 4 due to shocks, the bearing body moves laterally and automatically returns, under the action of the spring 7, into its central position due to the surface 8 co-operating with the seat 9.

The bush 6 has at its centre and at its rear end a stud 6a engaged in a blind hole 10 in the plug 2. The large base of the cone frustum 6a is situated at the end of the stud, whereby the latter is enabled to incline in all directions while remaining in the hole 10. Due to this arrangement, the bearing body is thus pivotally mounted on the support in such manner as to be able to rock in all directions, while being able to move axially. This pivotal mounting controls the rocking movement of the bearing body in the event of shocks such that the frustoconical surface 8 is removed from the seat 9.

Figure 2:
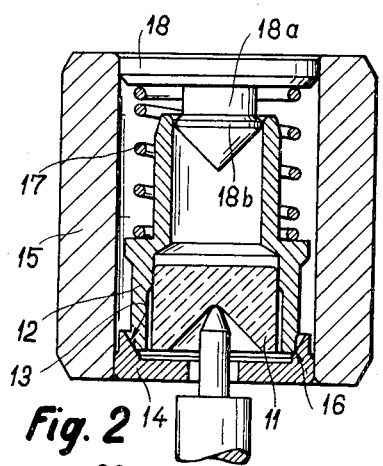
FIGURE 2 is a similar section through a second constructional form.

In the constructional form of FIGURE 2, the bearing body also comprises a pivot bearing 11 lodged in a mount formed of a sleeve 12. The centering of the bearing body is effected, at its forward end, by a frustoconical seat 13 formed in the plug 14 fixed to the forward end of a sleeve 15. A slightly chamfered terminal edge 16 of the sleeve 12 co-operates with the sleeve 13. A coil spring 17 bears on the sleeve 12 at one end, while at the other end it bears against a plug 18 driven into the sleeve 13.

The plug 18 is provided with a central stud 18a engaged in the sleeve 12 and having an annular projection 18b. Due to this arrangement, as in the preceding constructional form, the bearing body can at the same time move axially and rock in all directions.

Figure 3:
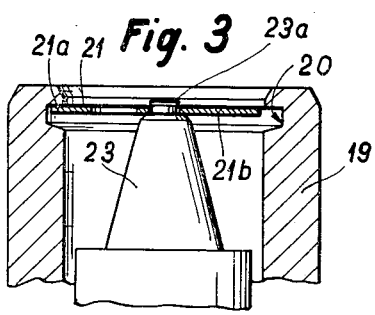
FIGURE 3 is a similar section through a part of a third constructional form.
Figure 4:
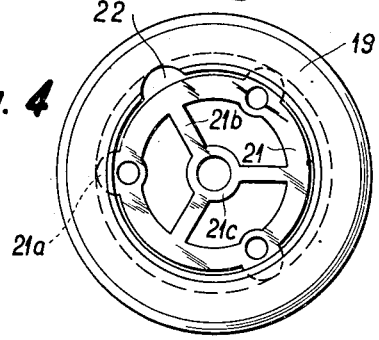
FIGURE 4 is a plan view thereof.
Figure 5:
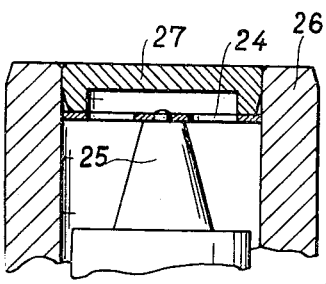
FIGURE 5 is an axial section through a part of a fourth constructional form.

In the constructional form of FIGURES 3 and 4, as in that of FIGURE 5, only the pivotal mounting of the rear portion of the bearing body has been illustrated. The bearing body is centered at its forward end by a conical surface co-operating with an annular edge, the arrangement being similar to that of the first or second constructional form.

In FIGURES 3 and 4, the sleeve 19 of the bearing support has, close to its rear end, an internal groove 20 in which are engaged external lugs 21a of an annular spring 21. An inlet 22 (FIGURE 4) permits the introduction of the lugs 21a into the groove 20. The spring 21 has three radial arms 21b extending towards the centre and terminating at a ring 21c, which is fixed, by riveting at 23a, to a bush 23 similar to the bush 6 of the first constructional form, in which is mounted the pivot bearing (not shown). This assembly of the bush 23 with the bearing support enables the bush both to move axially and to rock in all directions. The spring 21 in this constructional form is equivalent to the spring 7 of the first constructional form and serves as a shock absorber.

The constructional form of FIGURE 5 differs from that of FIGURES 3 and 4 in that a spring 24, similar to the spring 21, secured to the end of a bush 25 supporting the pivot bearing, is maintained in position in the sleeve 26 constituting the bearing body by a plug 27 driven into the rear end of the said sleeve.

Figure 6:
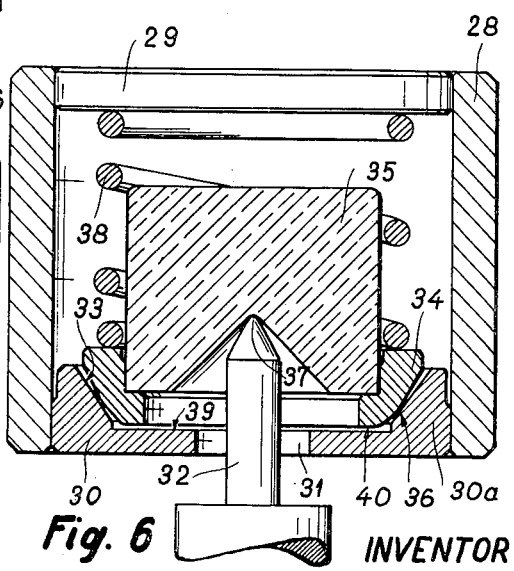
FIGURE 6 is an axial section through a fifth constructional form.

The bearing of FIGURE 6 comprises a mount consisting of a sleeve 28 into which are driven, on the one hand, a plug 29 and on the other hand a plug 30 formed with a central hole 31 for the passage of the shaft 32. A frustoconical seat 33 is provided in a thickened portion 30a of the plug 30. The said seat is designed to receive a bezel 34 associated with a pivot bearing 35. The bezel has for this purpose a bearing surface 36 consisting of a surface of revolution, of which the generatrix is an arc of a circle whose centre is coincident with the base 37 of the groove of the footstep bearing. Only the forward end of the latter is engaged in the bezel 34. A coil spring 38 surrounds the pivot bearing 35 and bears at one end against the bezel 34 and at the other end against the plug 29. The said coil spring serves to return to the inoperative position the bearing body formed of the pivot bearing 35 and its bezel 34 when the said bearing body has moved as a result of shocks to which the shaft has been subjected. The centering of the bearing body is effected by the frustoconical seat 33 of the plug 30 with which there co-operates the bearing surface 36 of the bezel 34. However, in order to ensure accurate positioning of the pivot bearing when it is inoperative, the plug 30 is formed with a plane surface 39 perpendicular to the axis of the bearing, with which surface there co-operates a place surface 40 on the bezel 34. These two surfaces are normally at a very small distance apart, whereby the machining tolerances are widened, but they come into contact with one another as soon as the pivot bearing tends to rock. The very slight rocking movements of the pivot bearing which are permitted by the slight distance separating the two surfaces 39 and 40 are of no importance, mainly by reason of the fact that the base 37 of the groove in the pivot bearing is at the same time the centre of the arc of a circle by which the surface 36 is generated. Consequently, in the event of small rocking movements, the pivot bearing turns about the point 37, whereby the position of the shaft 32 is not changed.

The frustoconical centering surface situated at the forward end of the bearing may be replaced by a different surface of revolution, for example of convex form.

It is to be noted that if the pivot bearing rocks slightly about its own axis which happens by reason of the various clearances existing between the movable parts of the bearing, this rocking does not de-centre the axis, because it takes place about the point situated at the base of the frustoconical hole in the pivot bearing.

What I claim is:

In a shock-absorbing bearing for the shaft of a small mechanism, notably of a measuring instrument, a bearing support having an annular centering seat, a movable bearing body comprising a pivot bearing provided with a conical recess receiving the end of said shaft and a tubular mount into one end of which the said pivot bearing is forced, said body being disposed with clearance within said bearing support, a central stud provided on the base of the said support engaged in the rear end of the said mount, the said stud having, between its tip and its base, a recessed portion by virtue of which the mount can rock in all directions while remaining engaged thereon, a bearing surface of the said body, situated in the immediate neighbourhood of the inlet of the said recess of the pivot bearing, and a resilient return device acting on said body for urging said bearing surface on said centering seat.

References Cited in the file of this patent

UNITED STATES PATENTS

| 733,611 | Alton | July 14, 1903 |
| 1,843,868 | Copelin | Feb. 2, 1932 |
| 2,708,609 | Triplett | May 17, 1955 |
| 2,919,961 | Matthey | Jan. 5, 1960 |

FOREIGN PATENTS

| 886,085 | Germany | Aug. 10, 1953 |
| 746,267 | Great Britain | Mar. 14, 1956 |